United States Patent
Gopal et al.

(10) Patent No.: US 9,891,996 B2
(45) Date of Patent: Feb. 13, 2018

(54) APPARATUS AND METHOD FOR RECOVERING AN INFORMATION HANDLING SYSTEM FROM A NON-OPERATIONAL STATE

(71) Applicant: DELL PRODUCTS, L.P., Round Rock, TX (US)

(72) Inventors: Pradeep Gopal, Round Rock, TX (US); Nikolai V. Vyssotski, Austin, TX (US); Richard M. Tonry, Austin, TX (US)

(73) Assignee: Dell Poducts, L.P., Round Rock, TX (US)

( * ) Notice: Subject to any disclaimer, the term of this patent is extended or adjusted under 35 U.S.C. 154(b) by 431 days.

(21) Appl. No.: 14/331,946

(22) Filed: Jul. 15, 2014

(65) Prior Publication Data

US 2016/0019116 A1 Jan. 21, 2016

(51) Int. Cl.
*G06F 11/14* (2006.01)
*G06F 21/57* (2013.01)
*G06F 21/44* (2013.01)
*G06F 21/64* (2013.01)

(52) U.S. Cl.
CPC .......... *G06F 11/1417* (2013.01); *G06F 21/44* (2013.01); *G06F 21/572* (2013.01); *G06F 21/64* (2013.01)

(58) Field of Classification Search
CPC ...... G06F 21/44; G06F 21/64; G06F 11/1417; G06F 21/572
See application file for complete search history.

(56) References Cited

U.S. PATENT DOCUMENTS

| | | | |
|---|---|---|---|
| 2,395,542 A | 5/1944 | Fordon | |
| 6,665,178 B2 | 12/2003 | Curlee et al. | |
| 8,172,495 B2 | 5/2012 | Shuert | |
| 8,189,014 B1 * | 5/2012 | Tam | G09G 5/14 345/629 |
| 8,322,118 B2 | 12/2012 | Ozias et al. | |
| 2004/0153724 A1 * | 8/2004 | Nicholson | G06F 11/0709 714/6.11 |
| 2005/0207103 A1 | 9/2005 | Russo | |
| 2006/0136703 A1 * | 6/2006 | Wisecup | G06F 9/4416 713/2 |
| 2009/0271660 A1 * | 10/2009 | Chin | G06F 11/1417 714/15 |

(Continued)

*Primary Examiner* — Terrell Johnson
(74) *Attorney, Agent, or Firm* — Isidore PLLC

(57) ABSTRACT

A method recovers an information handling system (IHS) from a non-operational state. The method includes determining if the non-operational state of the IHS has occurred. In response to determining that the non-operational state of the IHS has occurred, a basic input-output (BIOS) recovery device is identified as being coupled to an embedded controller. In response to identifying that the BIOS recovery device is coupled to the embedded controller, an IHS type is transmitted to the BIOS recovery device. The BIOS recovery device is signaled to determine if the BIOS recovery device contains a BIOS payload corresponding to the IHS type. In response to determining that the BIOS recovery device contains the BIOS payload corresponding to the IHS type, the BIOS recovery device is triggered to transmit the BIOS payload to the embedded controller. The IHS is triggered to restart using the new BIOS payload.

22 Claims, 13 Drawing Sheets

(56) References Cited

U.S. PATENT DOCUMENTS

2011/0138220 A1\* 6/2011 Gough ................ G06F 11/1004
  714/5.1
2015/0331754 A1\* 11/2015 Grobelny ............ G06F 11/1438
  714/23

\* cited by examiner

APPARATUS AND METHOD FOR RECOVERING AN INFORMATION HANDLING SYSTEM FROM A NON-OPERATIONAL STATE

BACKGROUND

1. Technical Field

The present disclosure generally relates to information handling systems and in particular to recovering an information handling system (IHS) from a non-operational state.

2. Description of the Related Art

As the value and use of information continue to increase, individuals and businesses seek additional ways to process and store information. One option available to users is information handling systems. An information handling system generally processes, compiles, stores, and/or communicates information or data for business, personal, or other purposes, thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Information handling systems use basic input-output system (BIOS) software to initialize and test the system hardware components and to load an operating system. The BIOS provides an abstraction layer for the hardware to allow application programs and operating systems to interact with the keyboard, display, and other input/output devices. The BIOS software is stored in a non-volatile memory device such as a flash memory device and is designed to work with a particular model of computer. The BIOS software can be updated to add new features or to fix errors by saving a new version of the BIOS to the flash memory device.

When a BIOS update malfunctions, the result is the information handling system does not operate. Often, the only way to repair the information handling system from a BIOS update malfunction is to replace the computer motherboard of the information handling system. Unfortunately, replacing the computer motherboard results in additional cost and leaves the user without a functional information handling system.

BRIEF SUMMARY

Disclosed is a method, an information handling system and a basic input-output (BIOS) recovery device for recovering an information handling system (IHS) from a non-operational state.

According to one embodiment, the method comprises determining, via an embedded controller of the IHS, if the non-operational state of the IHS has occurred. The method includes identifying a BIOS recovery device as communicatively coupled to the embedded controller, in response to determining that the non-operational state of the IHS has occurred. The method further includes transmitting a first IHS type to the BIOS recovery device, in response to identifying that the BIOS recovery device is communicatively coupled to the embedded controller.

Also disclosed is an IHS that comprises a processor and a memory coupled to the processor via a system interconnect. An embedded controller is communicatively coupled to the system interconnect. The embedded controller has firmware executing thereon to enable the IHS to recover from a non-operational state of the IHS. The firmware configures the embedded controller to determine if the non-operational state of the IHS has occurred. In response to determining that the non-operational state of the IHS has occurred, the embedded controller identifies if a BIOS recovery device is communicatively coupled to the embedded controller. In response to identifying that the BIOS recovery device is communicatively coupled to the embedded controller, the embedded controller transmits a first IHS type to the BIOS recovery device and signals the BIOS recovery device to determine if the BIOS recovery device contains a first BIOS payload corresponding to the first IHS type. In response to determining that the BIOS recovery device contains the first BIOS payload corresponding to the first IHS type, the embedded controller triggers the BIOS recovery device to transmit the first BIOS payload from the BIOS recovery device to the embedded controller and triggers the IHS to restart using the first BIOS payload.

According to another embodiment, a BIOS recovery device comprises a micro-controller and a storage device communicatively coupled to the micro-controller. At least one BIOS payload is stored on the storage device. The micro-controller has firmware executing thereon to enable the IHS to recover from the non-operational state of the IHS, wherein the firmware configures the micro-controller to receive a request from an embedded controller of the IHS to determine if the storage device contains a first BIOS payload corresponding to a first IHS type associated with the connected IHS. In response to determining that the storage device contains the first BIOS payload corresponding to the first IHS type, the micro-controller transmits the first BIOS payload from the BIOS recovery device to the embedded controller.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

BRIEF DESCRIPTION OF THE DRAWINGS

The description of the illustrative embodiments can be read in conjunction with the accompanying figures. It will be appreciated that for simplicity and clarity of illustration, elements illustrated in the figures have not necessarily been drawn to scale. For example, the dimensions of some of the elements are exaggerated relative to other elements. Embodiments incorporating teachings of the present disclosure are shown and described with respect to the figures presented herein, in which.

DETAILED DESCRIPTION

The illustrative embodiments provide a method, an information handling system and a basic input-output (BIOS) recovery device for recovering an information handling system (IHS) from a non-operational state.

In the following detailed description of exemplary embodiments of the disclosure, specific exemplary embodiments in which the disclosure may be practiced are described in sufficient detail to enable those skilled in the art to practice the disclosed embodiments. For example, specific details such as specific method orders, structures, elements, and connections have been presented herein. However, it is to be understood that the specific details presented need not be utilized to practice embodiments of the present disclosure. It is also to be understood that other embodiments may be utilized and that logical, architectural, programmatic, mechanical, electrical and other changes may be made without departing from general scope of the disclosure. The following detailed description is, therefore, not to be taken in a limiting sense, and the scope of the present disclosure is defined by the appended claims and equivalents thereof.

References within the specification to "one embodiment," "an embodiment," "embodiments", or "one or more embodiments" are intended to indicate that a particular feature, structure, or characteristic described in connection with the embodiment is included in at least one embodiment of the present disclosure. The appearance of such phrases in various places within the specification are not necessarily all referring to the same embodiment, nor are separate or alternative embodiments mutually exclusive of other embodiments. Further, various features are described which may be exhibited by some embodiments and not by others. Similarly, various requirements are described which may be requirements for some embodiments but not other embodiments.

It is understood that the use of specific component, device and/or parameter names and/or corresponding acronyms thereof, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that terms is utilized.

Figure 1:
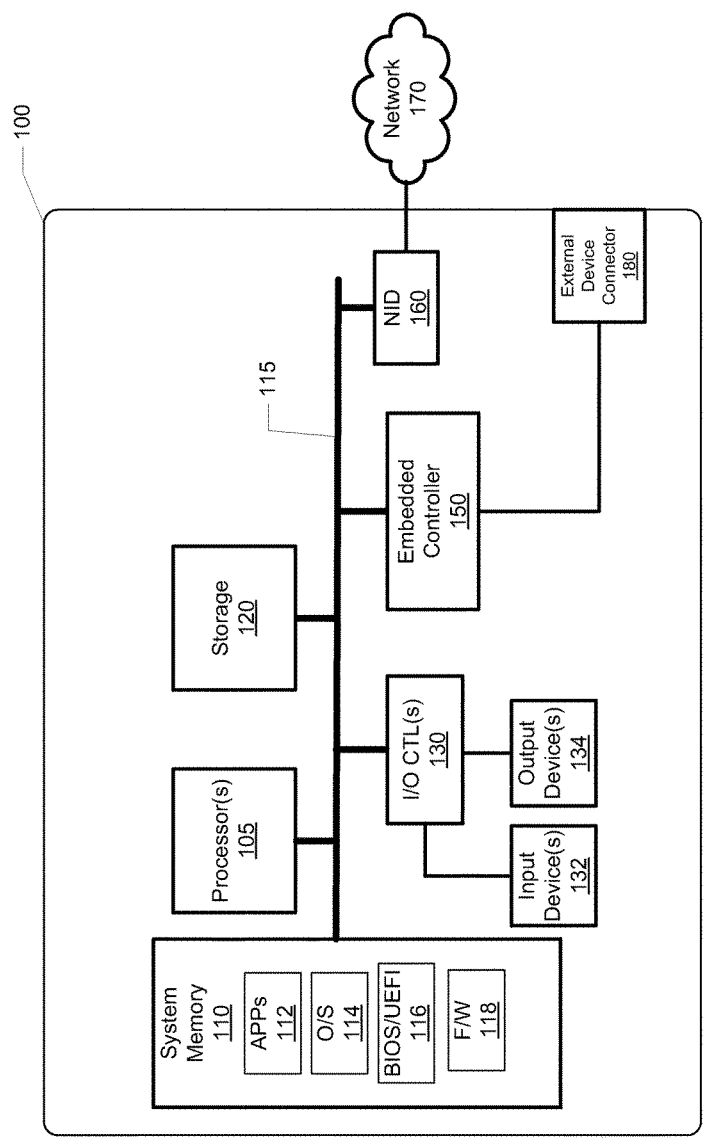
FIG. 1 illustrates an example information handling system within which various aspects of the disclosure can be implemented, according to one or more embodiments.

FIG. 1 illustrates a block diagram representation of an example information handling system (IHS) 100, within which one or more of the described features of the various embodiments of the disclosure can be implemented. For purposes of this disclosure, an information handling system, such as IHS 100, may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a handheld device, personal computer, a server, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Referring specifically to FIG. 1, example IHS 100 includes processor(s) 105 coupled to system memory 110 via system interconnect 115. System interconnect 115 can be interchangeably referred to as a system bus, in one or more embodiments. Also coupled to system interconnect 115 is storage 120 within which can be stored one or more software and/or firmware modules and/or data (not specifically shown). In one embodiment, storage 120 can be hard drive or a solid state drive. The one or more software and/or firmware modules within storage 120 can be loaded into system memory 110 during operation of IHS 100. As shown, system memory 110 can include therein a plurality of software and/or firmware modules including applications 112, operating system (O/S) 114, basic input/output system (BIOS) 116, and firmware (F/W) 118.

In one or more embodiments, BIOS 116 comprises additional functionality associated with unified extensible firmware interface (UEFI), and can be more completely referred to as BIOS/UEFI in these embodiments. The various software and/or firmware modules have varying functionality when their corresponding program code is executed by processor(s) 105 or other processing devices within IHS 100.

IHS 100 further includes one or more input/output (I/O) controllers 130 which support connection by, and processing of signals from, one or more connected input device(s) 132, such as a keyboard, mouse, touch screen, or microphone. I/O controllers 130 also support connection to and forwarding of output signals to one or more connected output device(s) 134, such as a monitor or display device or audio speaker(s).

Additionally, in one or more embodiments, IHS 100 includes an embedded controller 150, which is in communication with processor(s) 105 and system memory 110 via system interconnect 115. Embedded controller 150 contains components that enable recovery of IHS 100 from a non-operational state. Embedded controller 150 is connected to an external device connector 180. External device connector 180 allows external devices to be selectively attached to and to communicate with IHS 100.

IHS 100 further comprises a network interface device (NID) 160. NID 160 enables IHS 100 to communicate and/or interface with other devices, services, and components that are located external to IHS 100. These devices, services, and components can interface with IHS 100 via an external network, such as example network 170, using one or more communication protocols. In one embodiment, a customer provisioned system/platform can comprise multiple devices located across a distributed network, and NID 160 enables IHS 100 to be connected to these other devices. Network 170 can be a local area network, wide area network, personal area network, and the like, and the connection to and/or between network and IHS 100 can be wired or wireless or a combination thereof. For purposes of discussion, network 170 is indicated as a single collective component for simplicity. However, it is appreciated that network 170 can comprise one or more direct connections to other devices as well as a more complex set of interconnections as can exist within a wide area network, such as the Internet.

FIGS. 2-6 illustrate block diagrams of exemplary BIOS recovery sub-systems that enable IHS 100 to recover from a non-operational state. Each of the figures represents one or more embodiments of the disclosure. The description of each FIGS. 2-6 is provided with general reference to the specific components illustrated within the preceding FIG. 1.

Figure 2:
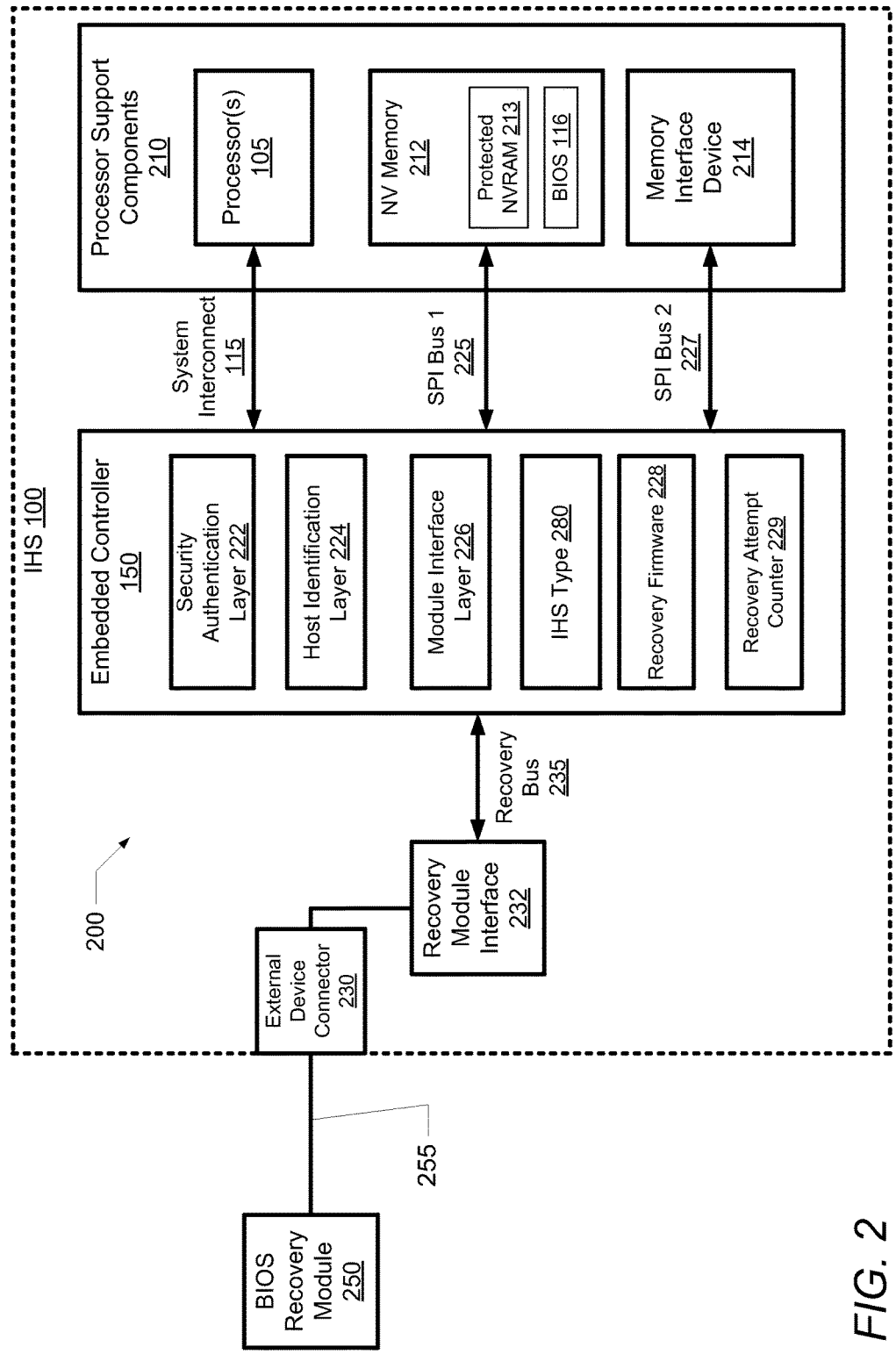
FIG. 2 illustrates a component level view of a BIOS recovery sub-system having a embedded controller and other functional components that support recovering an information handling system (IHS) from a non-operational state, in accordance with one embodiment.

With reference now to FIG. 2, there is illustrated one embodiment of a component level view of a BIOS recovery sub-system 200 that supports recovering IHS 100 from a non-functional, non-operational state. A non-operational state of IHS 100 can occur when an update to BIOS 116 malfunctions. BIOS recovery sub-system 200 comprises embedded controller 150, processor support components 210 and recovery module interface 232. A BIOS recovery device or module 250 can be selectively connected to IHS 100 via an electrical cable 255. Cable 255 contains a module bus. Embedded controller 150 is coupled to system interconnect 115 in order to communicate with other components of IHS 100.

Embedded controller 150 contains a security authentication layer 222, a host identification layer 224, a module interface layer 226, an IHS type 280, recovery firmware 228 and recovery attempt counter 229. The security authentication layer 222 provides an authenticating process to verify the identity of a connected BIOS recovery device or module 250 that is connected to IHS 100. The security authentication layer 222 ensures that the BIOS recovery device 250 is an authorized secure device. The host identification layer 224 identifies the connected host or IHS 100 that is connected to BIOS recovery device 250. The host identification layer 224 also identifies the computer (IHS) type and model to BIOS recovery device 250. The BIOS recovery device 250 queries the embedded controller 150 to determine the system type and level of support. The module interface layer 226 is a physical communication interface that allows communication between embedded controller 150 and BIOS recovery device 250. IHS type 280 identifies the specific components and configuration of IHS 100. Recovery firmware 228, when executed by embedded controller 150, enables recovering IHS 100 from a non-functional, non-operational state. Embedded controller 150 contains logic and memory that can execute recovery firmware 228.

Processor support components 210 include components that support the operation of processor(s) 105. Processor support components 210 include a non-volatile memory device 212 and a memory interface device 214. Non-volatile memory device 212 has a protected NVRAM region 213. Protected NVRAM region 213 is a specific region of non-volatile memory device 212 where system and customer settings are stored. Non-volatile memory device 212 can store BIOS software/firmware 116 for use by processor(s) 105 during start-up operations. BIOS software/firmware 116 is also commonly referred to as a BIOS image. Memory interface device 214 facilitates authenticated communication between non-volatile memory device 212 and other components of IHS 100. Non-volatile memory device 212 is communicatively coupled with embedded controller 150 via serial peripheral interface (SPI) bus 1 225. Memory interface device 214 is communicatively coupled with embedded controller 150 via SPI bus 2 227. In one embodiment, memory interface device 214 communicates with non-volatile memory device 212 through embedded controller 150. In other words, embedded controller 150 can emulate memory interface device 214.

Embedded controller 150 is also communicatively coupled to recovery module interface 232 via a recovery bus 235. Recovery module interface 232 allows for communication between embedded controller 150 and BIOS recovery device 250. Recovery module interface 232 is connected to an external device connector 230. External device connector 230 can have several physical form factors and types. A BIOS recovery device or module 250 can be selectively connected to IHS 100 via an electrical cable 255.

Figure 3:
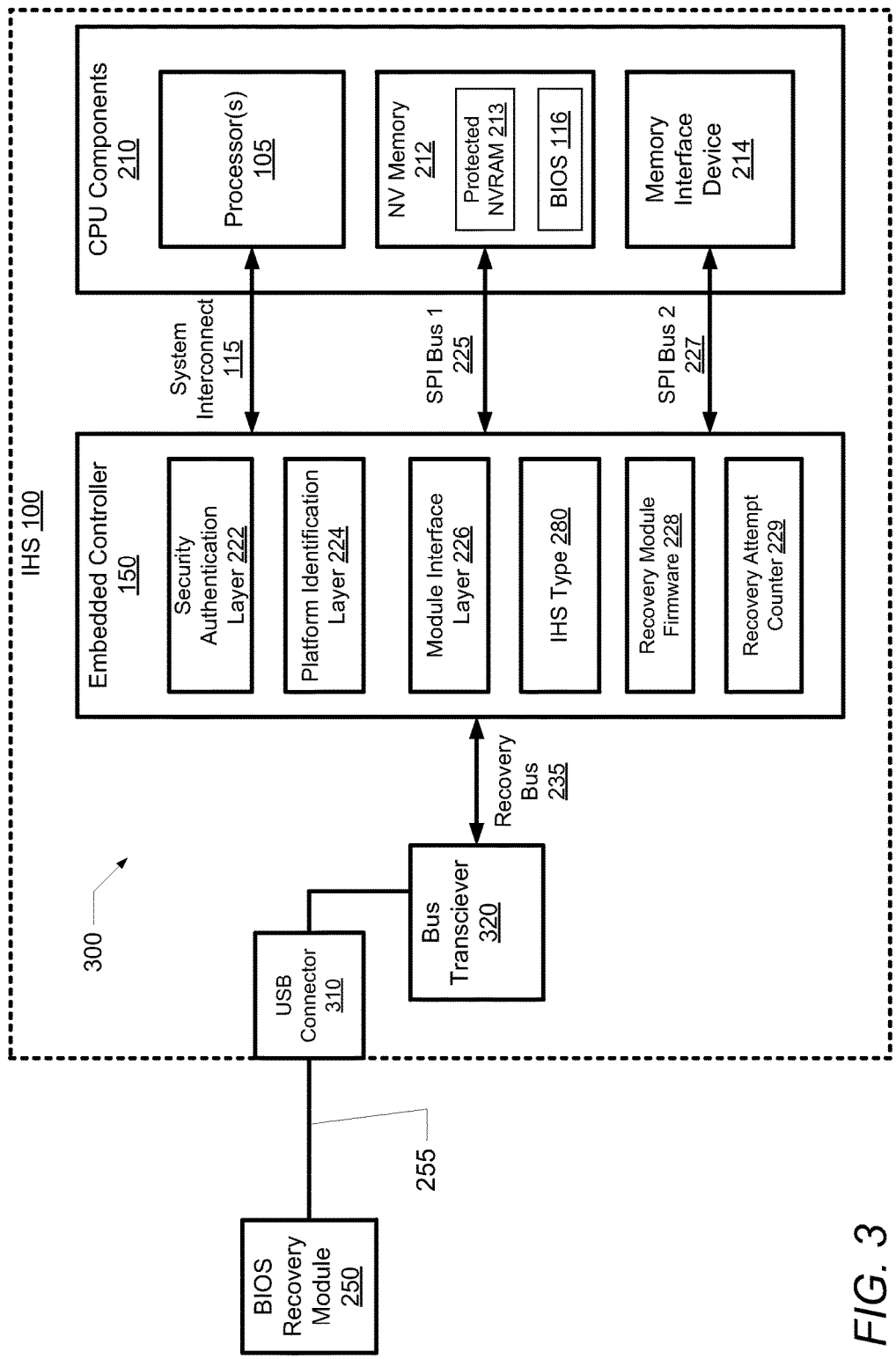
FIG. 3 illustrates a component level view of a BIOS recovery sub-system having a USB connector, an embedded controller and other functional components that support recovering an information handling system (IHS) from a non-operational state, in accordance with one embodiment.

Referring to FIG. 3, there is illustrated another embodiment of a component level view of a BIOS recovery sub-system 300 that supports recovering IHS 100 from a non-functional, non-operational state. BIOS recovery sub-system 300 has some similarities with BIOS recovery sub-system 200. However, in FIG. 3, external device connector 230 of FIG. 2 has been replaced by a universal serial bus (USB) connector 310 and recovery module interface 232 has been replaced by a bus transceiver 320. In this embodiment, electrical cable 255 is a USB bus. USB connector 310 and bus transceiver 320 facilitate the transmission of a new BIOS payload from BIOS recovery device 250 to IHS 100 via a USB bus and USB connector 310.

Figure 4:
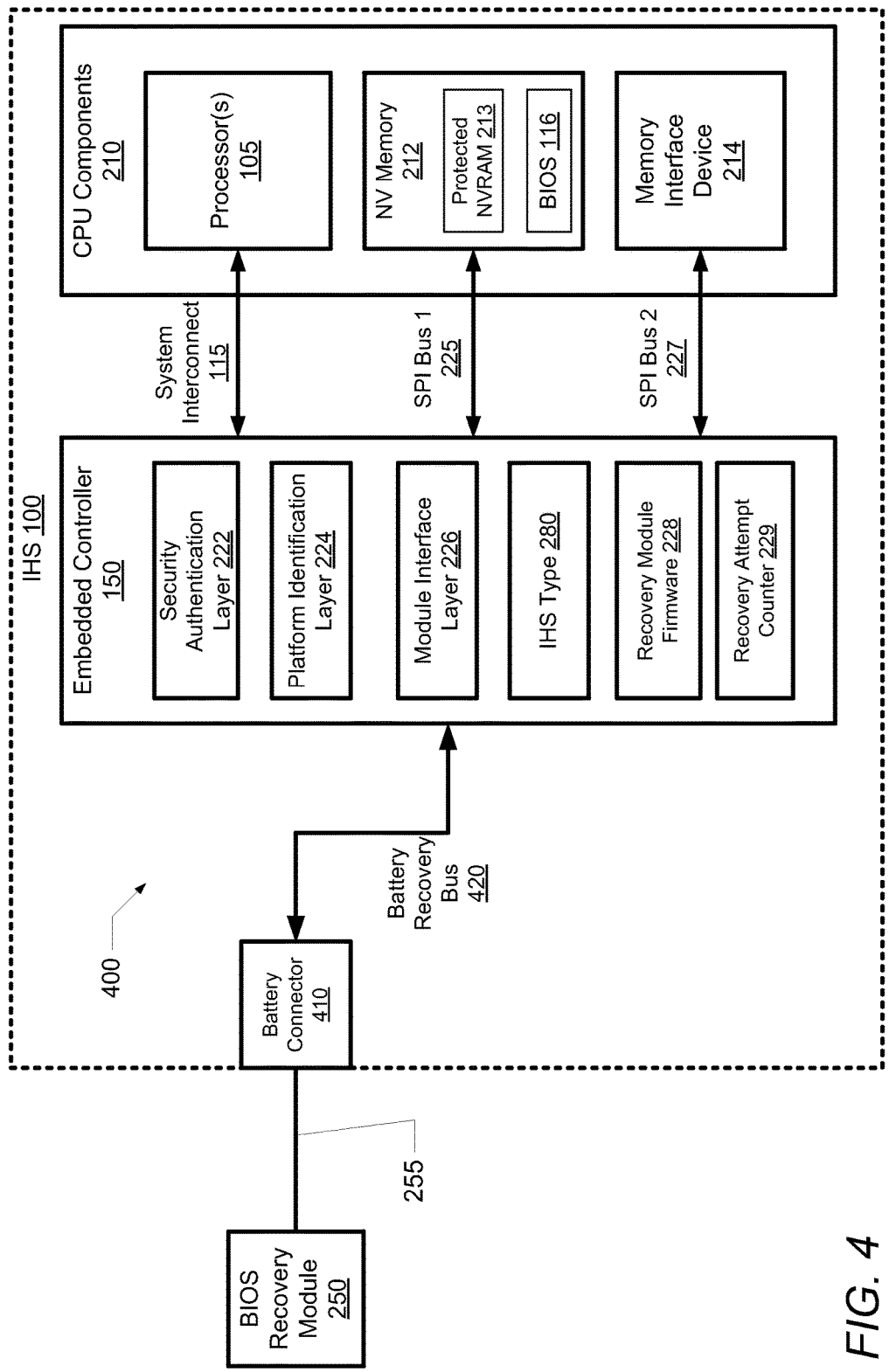
FIG. 4 illustrates a component level view of a BIOS recovery sub-system having a battery connector, an embedded controller and other functional components that support recovering an information handling system (IHS) from a non-operational state, in accordance with one embodiment.

Turning to FIG. 4, there is illustrated another embodiment of a component level view of a BIOS recovery sub-system 400 that supports recovering IHS 100 from a non-functional, non-operational state. BIOS recovery sub-system 400 has some general similarities with BIOS recovery sub-system 200. However, in FIG. 4, external device connector 230 of FIG. 2 has been replaced by a battery connector 410, recovery module interface 232 has been deleted and recovery bus 235 has been replaced by a battery recovery bus 420. Battery connector 410 and battery recovery bus 420 facilitate the transmission of a new BIOS payload from BIOS recovery device 250 to IHS 100 via battery connector 410 and battery recovery bus 420.

In one embodiment, on a failed boot, embedded controller 150 sends a BIOS Recovery Module (BRM) query on the battery recovery bus 420 and battery connector 410 via battery SMBUS signals. If embedded controller 150 detects the BRM query on battery recovery bus 420 via battery connector 410, embedded controller 150 initiates a security authentication routine to insure the BIOS recovery device 250 is a trusted device. This establishes a secure connection between embedded controller 150 and the BIOS recovery device 250. The embedded controller 150 transmits the IHS type 280 to the BIOS recovery device 250. If the BIOS recovery device 250 supports the IHS type 280, the BIOS recovery device 250 will respond with a supported flag. If not, the recovery process will not proceed. The embedded controller 150 queries the BIOS recovery device 250 for a corresponding BIOS payload. If the BIOS payload corresponding to the IHS type is found, embedded controller 150 instructs the BIOS recovery device 250 to stream the payload to the embedded controller 150 via battery connector 410 and battery recovery bus 420. The embedded controller 150 receives the BIOS payload and either streams the data directly to memory interface device 214 via SPI Bus 2 227 or programs the non-volatile memory 212 via SPI Bus 1 225 directly from embedded controller 150 depending on a selected recovery mode (see for example, blocks 948, 966, and 982 of FIG. 9). Embedded controller 150 acts as a SPI programmer and programs the SPI component. In one selected recovery mode (block 966), the EC reserves a portion of NV memory 212 (i.e. protected NVRAM region 213) at block 970. In another selected recovery mode, if the recovery path for block 964 previously failed, then the embedded controller 150 will program the entire BIOS region of NV memory 212 (block 982).

Figure 5:
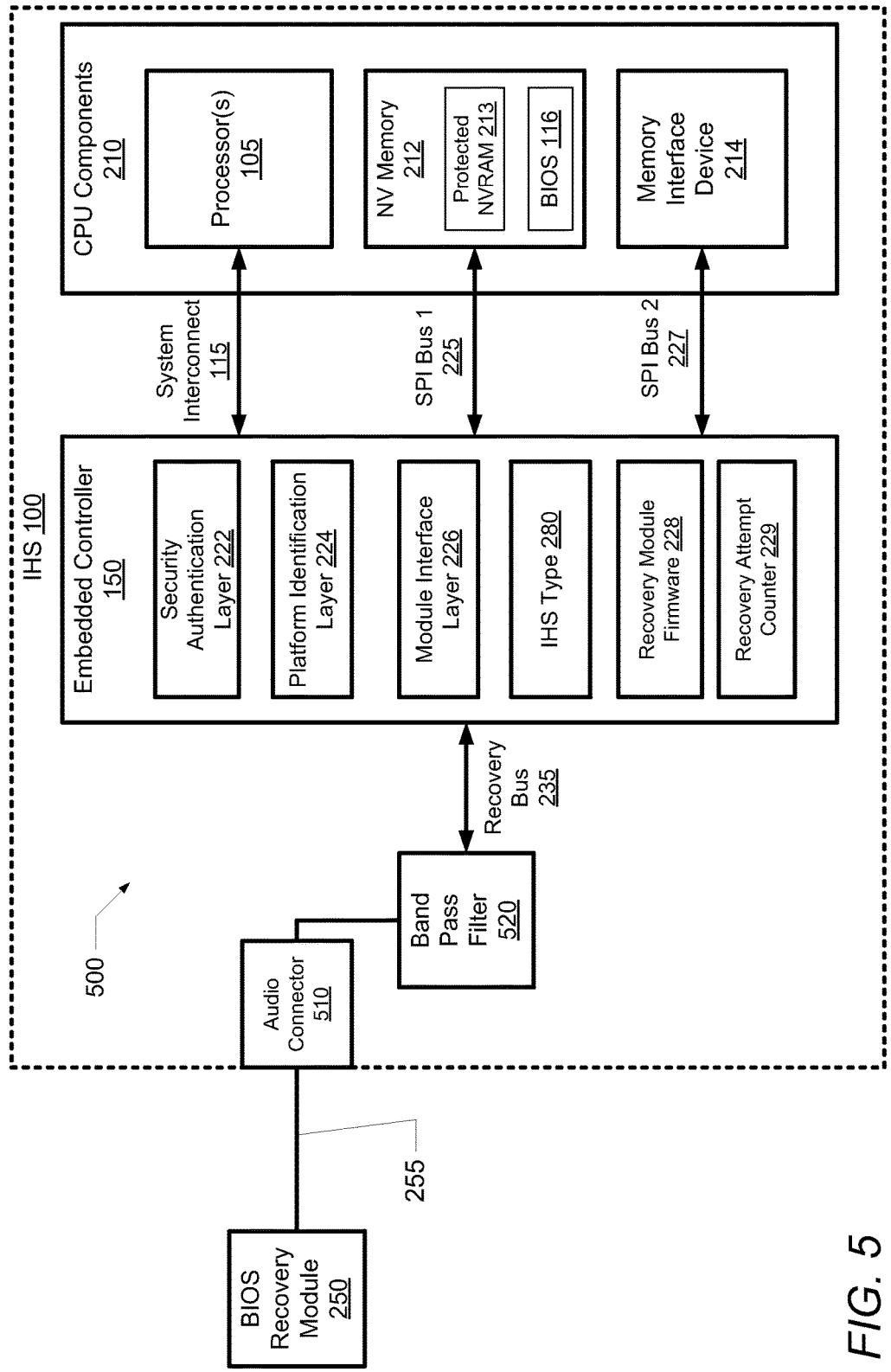
FIG. 5 illustrates a component level view of a BIOS recovery sub-system having an audio connector, an embedded controller and other functional components that support recovering an information handling system (IHS) from a non-operational state, in accordance with one embodiment.

Referring to FIG. 5, there is illustrated an additional embodiment of a component level view of a BIOS recovery sub-system 500 that supports recovering IHS 100 from a non-functional, non-operational state. BIOS recovery sub-system 500 has certain similarities with BIOS recovery sub-system 200. However, in FIG. 5, external device connector 230 of FIG. 2 has been replaced by an audio connector 510 and recovery module interface 232 has been replaced by a band pass filter 520. Audio connector 510 and band pass filter 520 facilitate the transmission of a new BIOS payload from BIOS recovery device 250 to IHS 100 via audio connector 510 and band pass filter 520.

In one embodiment, on a failed boot, embedded controller 150 sends a BIOS Recovery Module (BRM) query through recovery bus 235, band pass filter 520 and audio connector 510 via audio signals. If embedded controller 150 detects the BRM query on bus 235, embedded controller 150 initiates a security authentication routine to insure the BIOS recovery device 250 is a trusted device. This establishes a secure connection between embedded controller 150 and the BIOS recovery device 250. The embedded controller 150 transmits the IHS type 280 to the BIOS recovery device 250. If the BIOS recovery device 250 supports the IHS type 280, the BIOS recovery device 250 will respond with a supported flag. If not, the recovery process will not proceed. The embedded controller 150 queries the BIOS recovery device 250 for a corresponding BIOS payload. If the BIOS payload corresponding to the IHS type is found, embedded controller 150 instructs the BIOS recovery device 250 to stream the payload to the embedded controller 150 via audio connector 510, bandpass filter 520 and recovery bus 235. The embedded controller 150 receives the BIOS payload and either streams the data directly to memory interface device 214 via SPI Bus 2 227 or programs the non-volatile memory 212 via SPI Bus 1 225 directly from embedded controller 150 depending on a selected recovery mode (FIG. 9). Embedded controller 150 acts as a SPI programmer and programs the SPI component. In one selected recovery mode (block 966), the EC reserves a portion of NV memory 212 (i.e. protected NVRAM region 213) at block 970. In another selected recovery mode, if the recovery path for block 964 previously failed, then the embedded controller 150 will program the entire BIOS region of NV memory 212 (block 982).

Figure 6:
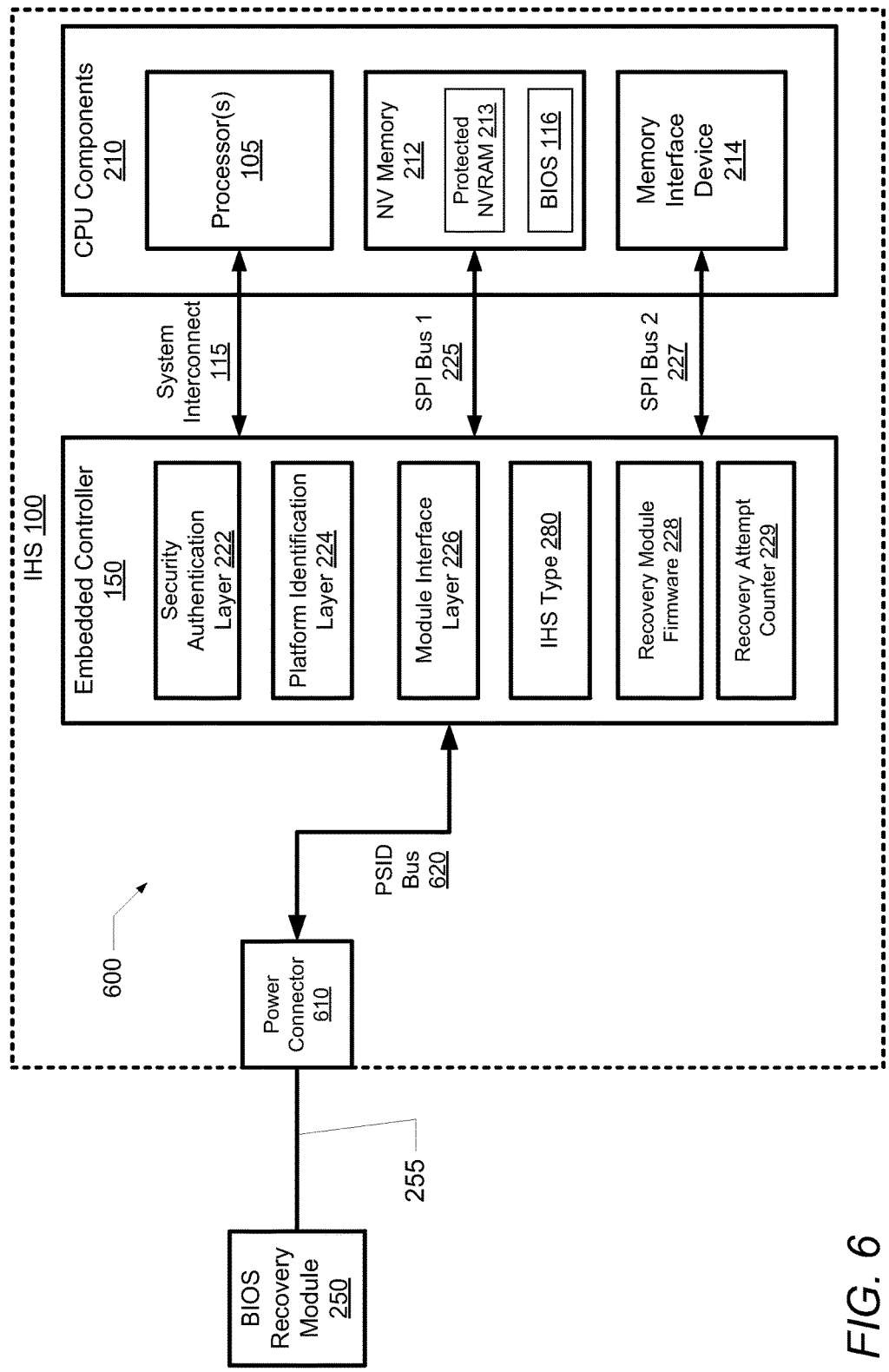
FIG. 6 illustrates a component level view of a BIOS recovery sub-system having a power connector, an embedded controller and other functional components that support recovering an information handling system (IHS) from a non-operational state, in accordance with one embodiment.

FIG. 6, illustrates one more embodiment of a component level view of a BIOS recovery sub-system 600 that supports recovering IHS 100 from a non-functional, non-operational state. BIOS recovery sub-system 600 has certain components that are similar to BIOS recovery sub-system 200. However, in FIG. 6, external device connector 230 of FIG. 2 has been replaced by a power connector 610, recovery module interface 232 has been deleted and recovery bus 235 has been replaced by power supply identification (PSID) bus 620. Power connector 610 and PSID bus 620 facilitate the transmission of a new BIOS payload from BIOS recovery device 250 to IHS 100 via power connector 610 and PSID bus 620.

In one embodiment, on a failed boot, embedded controller 150 sends a BIOS Recovery Module (BRM) query through PSID bus 620 and power connector 610 via a signal. If embedded controller 150 detects the BRM query on PSID bus 620, embedded controller 150 initiates a security authentication routine to insure the BIOS recovery device 250 is a trusted device. This establishes a secure connection between embedded controller 150 and the BIOS recovery device 250. The BIOS recovery device 250 transmits the IHS type 280 to the BIOS recovery device 250. If the BIOS recovery device 250 supports the IHS type 280, the BIOS recovery device 250 will respond with a supported flag. If not, the recovery process will not proceed. The BIOS recovery device 250 will query for a corresponding BIOS payload. If the BIOS payload corresponding to the IHS type is found, embedded controller 150 instructs the BIOS recovery device 250 to stream the payload to the embedded controller 150 via power connector 610 and PSID bus 620. The embedded controller 150 receives the BIOS payload and either streams the data directly to memory interface device 214 via SPI Bus 2 227 or programs the non-volatile memory 212 via SPI Bus 1 225 directly from embedded controller 150 depending on a selected recovery mode (FIG. 9). Embedded controller 150 acts as a SPI programmer and programs the SPI component. In one selected recovery mode (block 966), the EC reserves a portion of NV memory 212 (i.e. protected NVRAM region 213) at block 970. In another selected recovery mode, if the recovery path for block 964 previously failed, then the embedded controller 150 will program the entire BIOS region of NV memory 212 (block 982).

Figure 7:
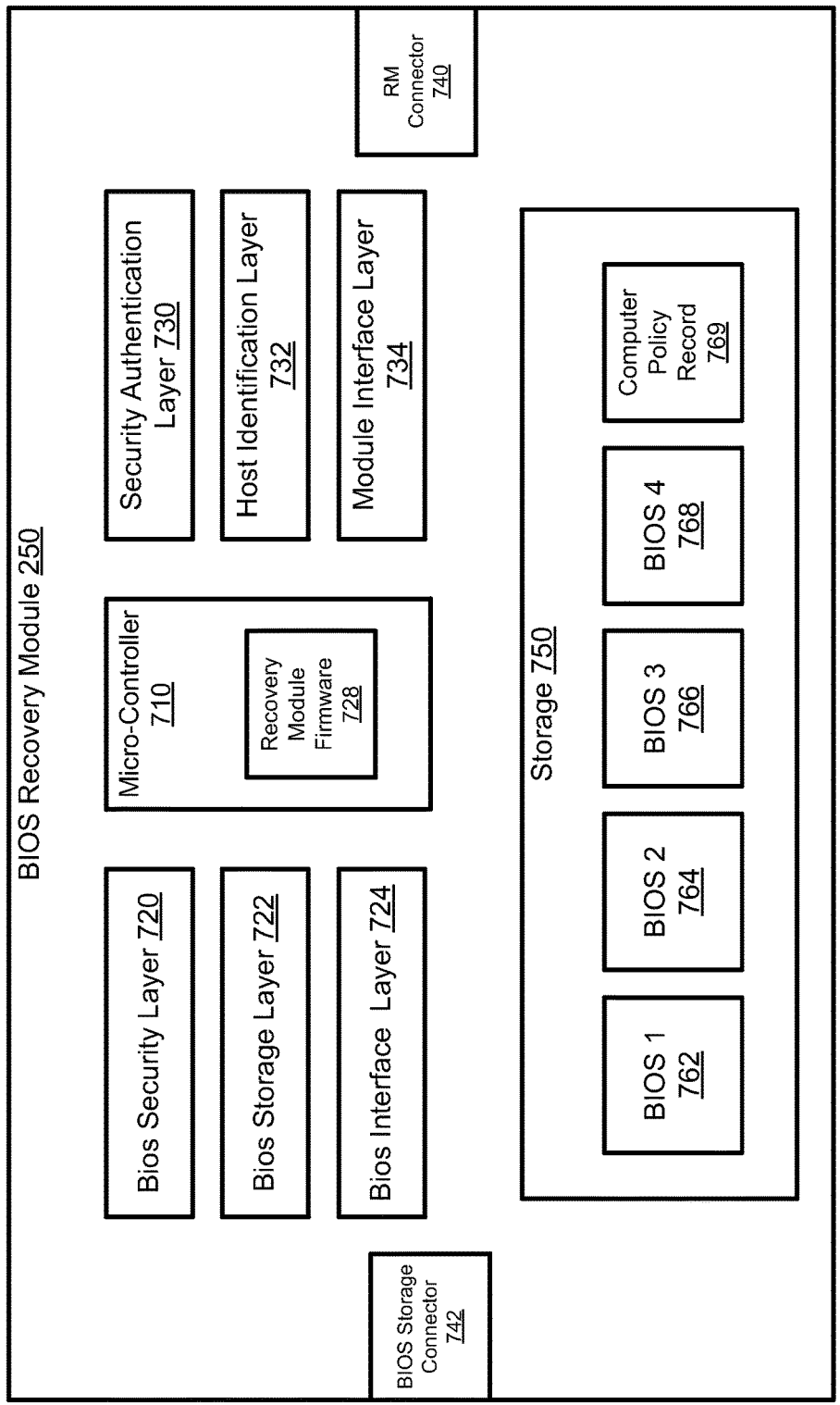
FIG. 7 illustrates a component level view of a BIOS recovery device, in accordance with one embodiment.

FIG. 7 illustrates details of a BIOS recovery module or device 250. The description of FIG. 7 also references components illustrated within the preceding FIGS. 1-6. BIOS recovery device 250 can be selectively connected to IHS 100. BIOS recovery module or device 250 stores BIOS payloads that can be transmitted to IHS 100 to allow IHS 100 to recover from a non-operational state. BIOS recovery device 250 comprises a micro-controller 710, BIOS security layer 720, BIOS storage layer 722, BIOS interface layer 724, security authentication layer 730, host identification layer 732, module interface layer 734, recovery module connector 740, BIOS storage connector 742 and storage 750. Storage 750 can store one or more new BIOS images or payloads including BIOS payload 1 762, BIOS payload 2 764, BIOS payload 3 766 and BIOS payload 4 768 (collectively BIOS payloads 762-768). Each of the BIOS payloads 762-768 are associated with a different one of IHS types 280.

Micro-controller 710 contains recovery module firmware 728. Recovery module firmware 728, when executed by micro-controller 710, enables the transmission of at least one new BIOS payload from BIOS recovery device 250 to IHS 100. Micro-controller 710 contains logic that can execute recovery module firmware 728. BIOS security layer 720 provides secure access by a security protocol to BIOS payloads 762-768, BIOS storage layer 722 facilitates storage of BIOS payloads 762-768 to storage 750. BIOS interface layer 724 allows IHS 100 to access information about BIOS payloads 762-768. BIOS security authentication layer 730 provides an authenticating process to verify the identity of a connected IHS 100. Host identification layer 732 provides a process to identify the type of IHS 100. Module interface layer 734 allows communication between BIOS recovery device 250 and IHS 100.

BIOS storage connector 742 can be connected to another computing device (not shown) by an electrical cable (not shown) in order to receive one or more BIOS payloads 762-768 to be stored in storage device 750. Recovery module connector 740 is connected to one end of electrical cable 255 (module bus). The other end of electrical cable 255 is connected to external device connector 230 of IHS 100. One or more new BIOS payloads 762-768 can be transmitted from BIOS recovery device 250 to IHS 100 via electrical cable 255.

In one embodiment, BIOS recovery sub-system 200 and BIOS recovery device 250 enable a computer-implemented method to recover IHS 100 from a non-operational state. Embedded controller 150 determines if the non-operational state of IHS 100 has occurred. In response to determining that the non-operational state of IHS 100 has occurred, a BIOS recovery device 250 is identified as being communicatively coupled to the embedded controller 150. In response to identifying that the BIOS recovery device 250 is communicatively coupled to the embedded controller 150, a first IHS type 280 is transmitted to the BIOS recovery device 250. The BIOS recovery device 250 is signaled to determine if the BIOS recovery device contains a first BIOS payload 762 corresponding to the first IHS type 280. In response to one of (1) the embedded controller 150 and (2) the BIOS recovery device 250 determining that the BIOS recovery device 250 contains the first BIOS payload 762 corresponding to the first IHS type 280, the BIOS recovery device 250 is triggered to transmit the first BIOS payload 762 from the BIOS recovery device 250 to the embedded controller 150. The embedded controller 150 stores the first BIOS payload 762 to a memory device 212 of the IHS 100 and triggers the IHS 100 to restart, using the first BIOS payload 762.

Those of ordinary skill in the art will appreciate that the hardware components and basic configuration depicted in FIGS. 1-7 and described herein may vary. For example, the illustrative components within IHS 100 (FIG. 1) and BIOS recovery subsystems 200-600 are not intended to be exhaustive, but rather are representative to highlight components that can be utilized to implement aspects of the present disclosure. For example, other devices/components may be used in addition to or in place of the hardware depicted. The depicted example does not convey or imply any architectural or other limitations with respect to the presently described embodiments and/or the general disclosure.

Figure 8A:
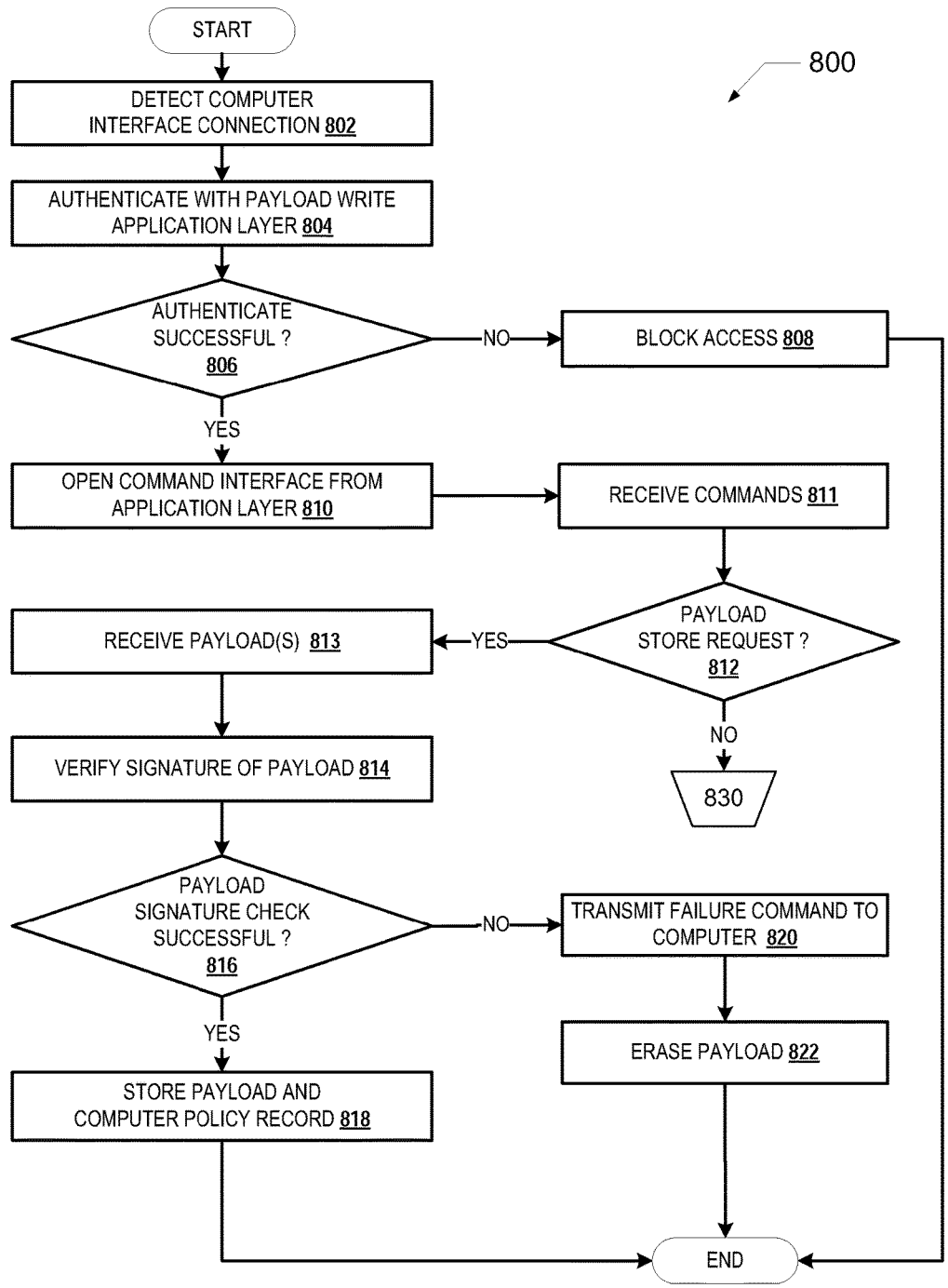
FIG. 8 (8A-8B) is a flow chart illustrating one example of the method by which BIOS payloads are stored to a BIOS recovery device, according to one or more embodiments.

The following flowcharts of FIGS. 8 (8A-8B) and 9 (9A-9C) disclose specific functionality provided by BIOS recovery subsystems 200-600 and BIOS recovery device 250. Specifically, the provided functionality is implemented by the execution of firmware 228 within embedded controller 150 and/or by the execution of firmware 728 within micro-controller 710 to recover IHS 100 from a non-operational state.

FIGS. 8 (8A-8B) and 9 (9A-9C) illustrate flowcharts of exemplary methods by which by BIOS recovery subsystems 200-600 and BIOS recovery device 250 within the preceding figures perform different aspects of the processes that enable the one or more embodiments of the disclosure. Generally, method 800 and method 900 collectively represent computer-implemented methods to enable IHS 100 to recover from a non-operational state. The description of each method is provided with general reference to the specific components illustrated within the preceding FIGS. 1-7. Method 800 is generally described as being implemented via BIOS recovery device 250 and particularly the execution of code provided by firmware 728 within BIOS recovery device 250. Method 900 is generally described as being implemented via BIOS recovery subsystem 200 and particularly the execution of code provided by firmware 228 within BIOS recovery subsystem 200. It is however appreciated that certain aspects of the described methods may be implemented via other processing devices and/or execution of other code.

Method 800 illustrates a process for storing BIOS payloads to BIOS recovery device 250. In one or more embodiments, method 800 can be performed during manufacturing and/or programming of the IHS 100. Method 800 begins at the start block and proceeds to block 802 where micro-controller 710, executing recovery module firmware 728 detects a connection to an external computer interface on or via BIOS storage connector 730. Micro-controller 710 authenticates the identity of the external computer with the BIOS security layer 720 (block 804). Micro-controller 710 determines if the authentication is successful (decision block 806). In response to the authentication not being successful, micro-controller 710 blocks access to BIOS recovery device 250 (block 808) and then method 800 ends. In response to the authentication being successful, micro-controller 710 opens a command interface from the application layer (block 810). At block 811, micro-controller 710 receives commands from the connected external computer. Micro-controller 710 determines if the received command is a payload store request command (decision block 812). In response to the received command being a payload store request command, micro-controller 710 receives one or more BIOS payloads 762-768 from the connected external computer (block 813).

Micro-controller 710 verifies a signature of BIOS payloads 762-768 via BIOS security layer 720 (block 814). Micro-controller 710 determines if the signature verification of the BIOS payload is successful (decision block 816). In response to the signature verification of the BIOS payload being successful, micro-controller 710 stores the BIOS payloads 762-768 and a computer policy record 769 to storage 750 (block 818). Method 800 then terminates. The computer policy record is a data base entry for the specific supported features of the IHS type. The computer policy record stores setting and configuration information for recovery options of IHS 100. For example, the computer policy record 769 can store information on what level of recovery is supported for the BIOS payload for a specific type of IHS. The record indicates to the IHS which specific mode of recovery (e.g., NVRAM override or SPI streaming or programming CPU components directly from the BIOS recovery device 250) to implement. In one or more embodiments, the computer policy record 769 can also serve as an override to the settings stored in the BIOS 116. If the IHS type indicates support for programming CPU components directly from the BIOS recovery device 250, but the computer policy record 769 on the BIOS recovery device 250 indicates otherwise, the computer policy record 769 can be used to override the policy on IHS 100. In response to the signature verification of the BIOS payload not being successful, micro-controller 710 transmits a failure command to the external computer (block 820) and erases the BIOS payloads 762-768 from storage 750 (block 822). Method 800 then ends.

Figure 8B:
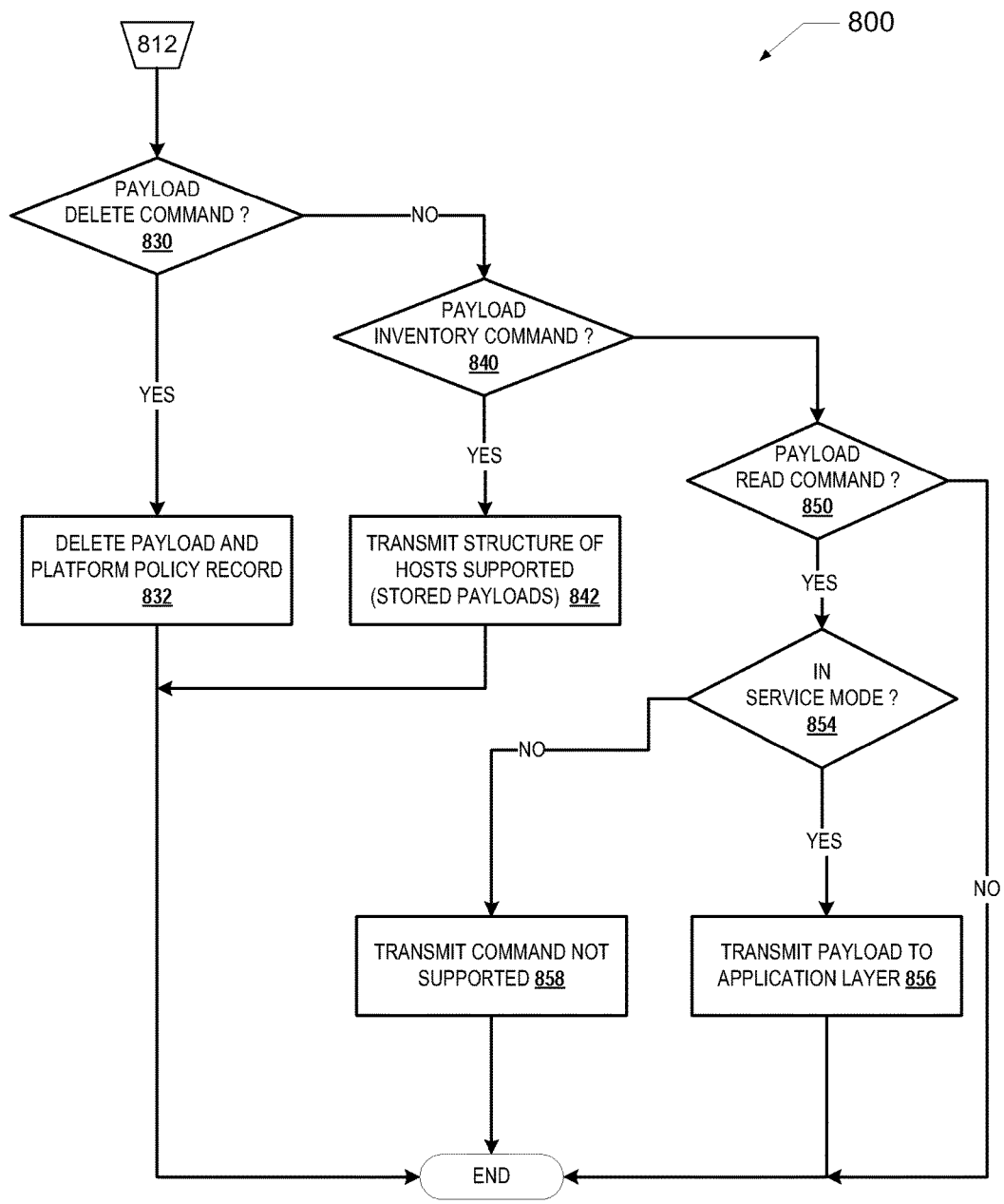

With reference to FIG. 8B, in response to the received command not being a payload store request command, micro-controller 710 determines if the received command is a payload delete command (decision block 830). In response to the received command being a payload delete command, micro-controller 710 deletes the existing BIOS payloads 762-768 and computer policy record from storage 750 (block 832). Method 800 then terminates. In response to the received command not being a payload delete command, micro-controller 710 determines if the received command is a payload inventory command (decision block 840). In response to the received command being a payload inventory command, micro-controller 710 transmits the types of BIOS payloads 762-768 to the external computer (block 842). Method 800 then ends.

However, in response to the received command not being a payload inventory command, micro-controller 710 determines if the received command is a payload read command (decision block 850). In response to the received command not being a payload read command, method 800 then ends. In response to the received command being a payload read command, micro-controller 710 determines if a service mode is active (decision block 854). The service mode is a secure mode that enables the BIOS recovery device 250 to allow extended operations to the application layer. Normally, the BIOS payload data 762-768 is write-only. In method 800, BIOS recovery device 250 will not allow reading (retrieving) of the BIOS payload data 762-768 from storage 750 unless the service mode is active.

In response to the service mode being active, micro-controller 710 transmits the BIOS payloads 762-768 to an application layer (block 856). Method 800 then terminates. In response to the service mode not being active, micro-controller 710 transmits a "command not supported" notice to the external computer (block 858). Method 800 then ends.

Figure 9A:
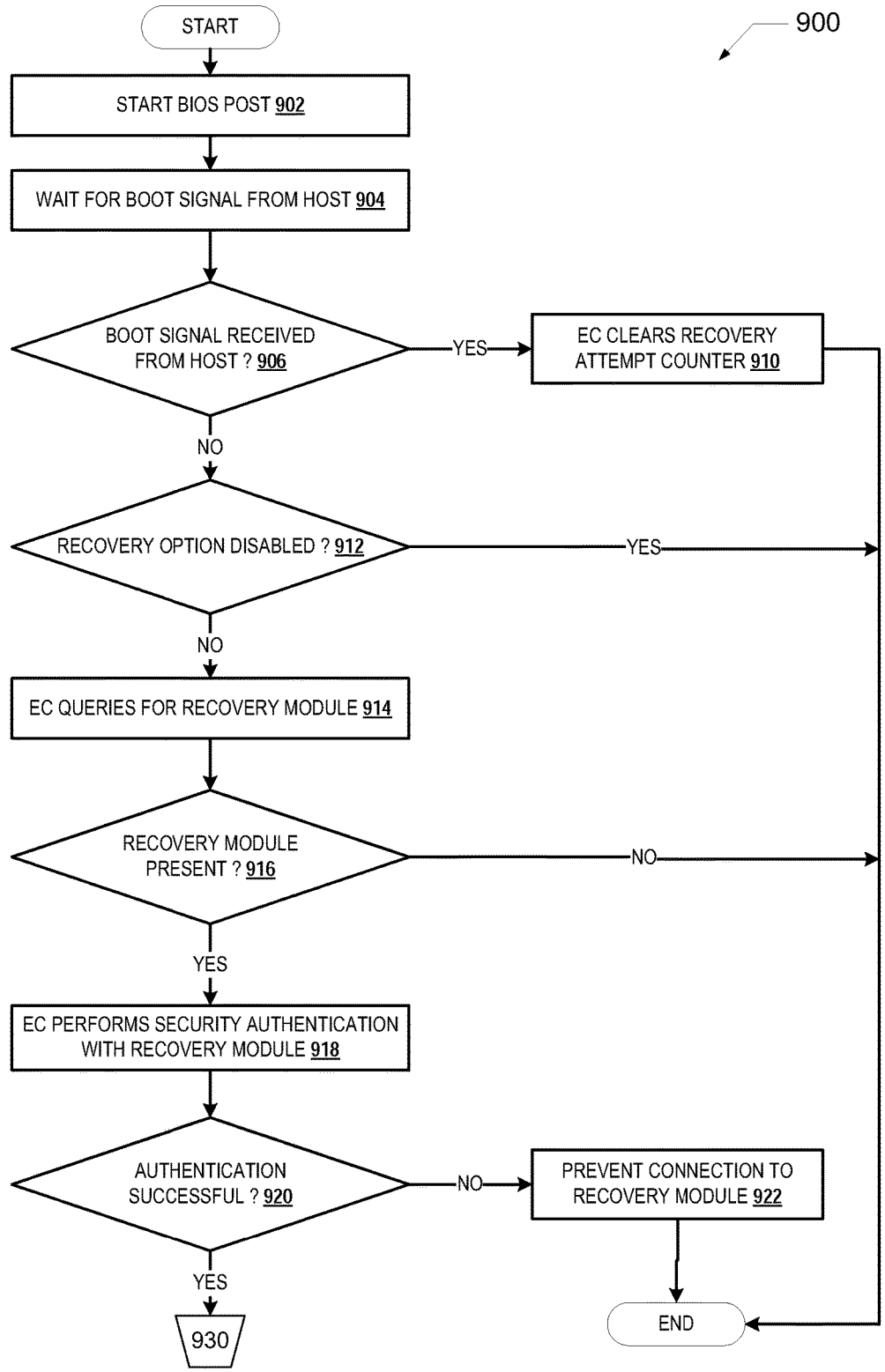
FIG. 9 (9A-9D) is a flow chart illustrating one example of the method by which an information handling system (IHS) recovers from a non-operational state, in accordance with one embodiment.
Figure 9B:
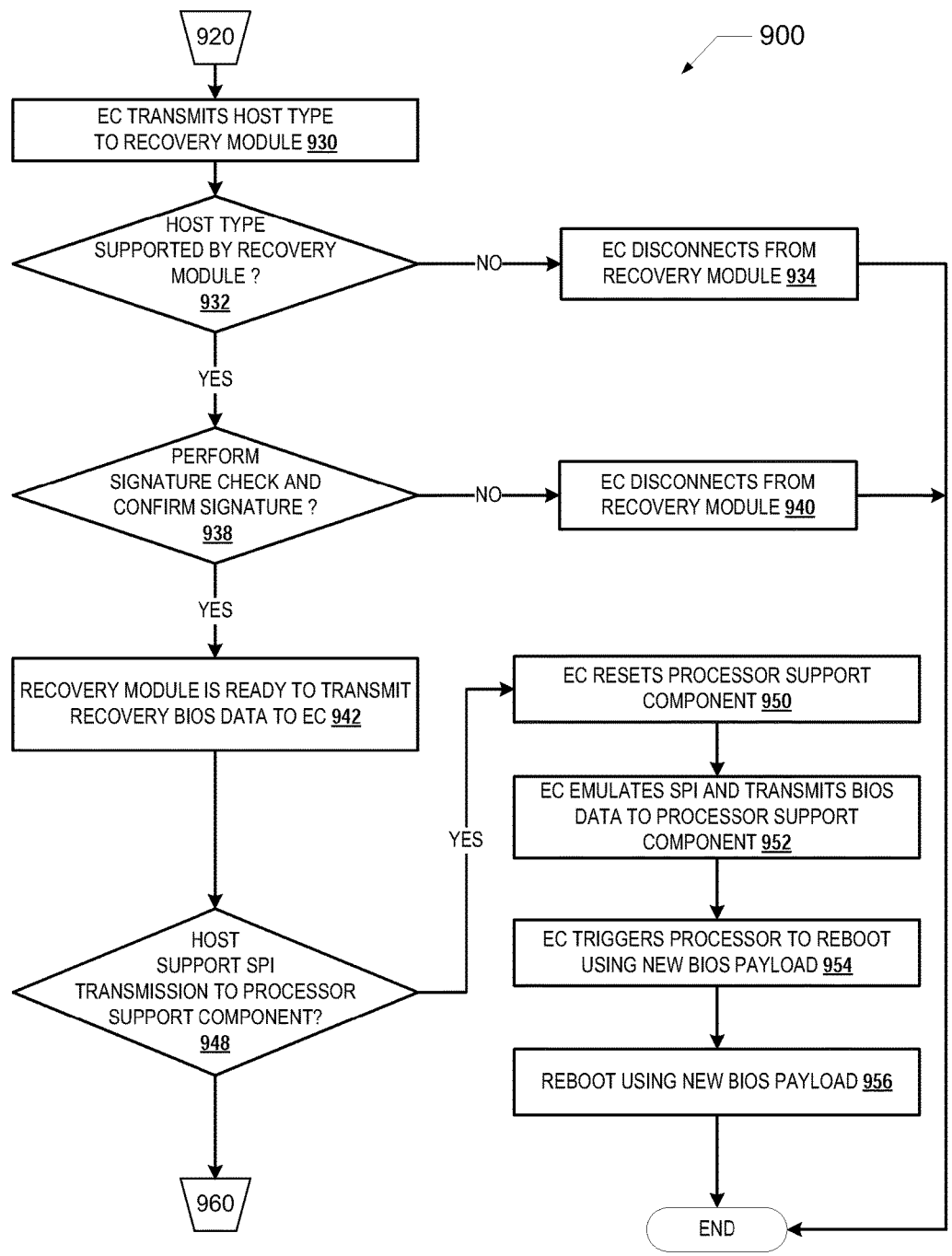
Figure 9C:
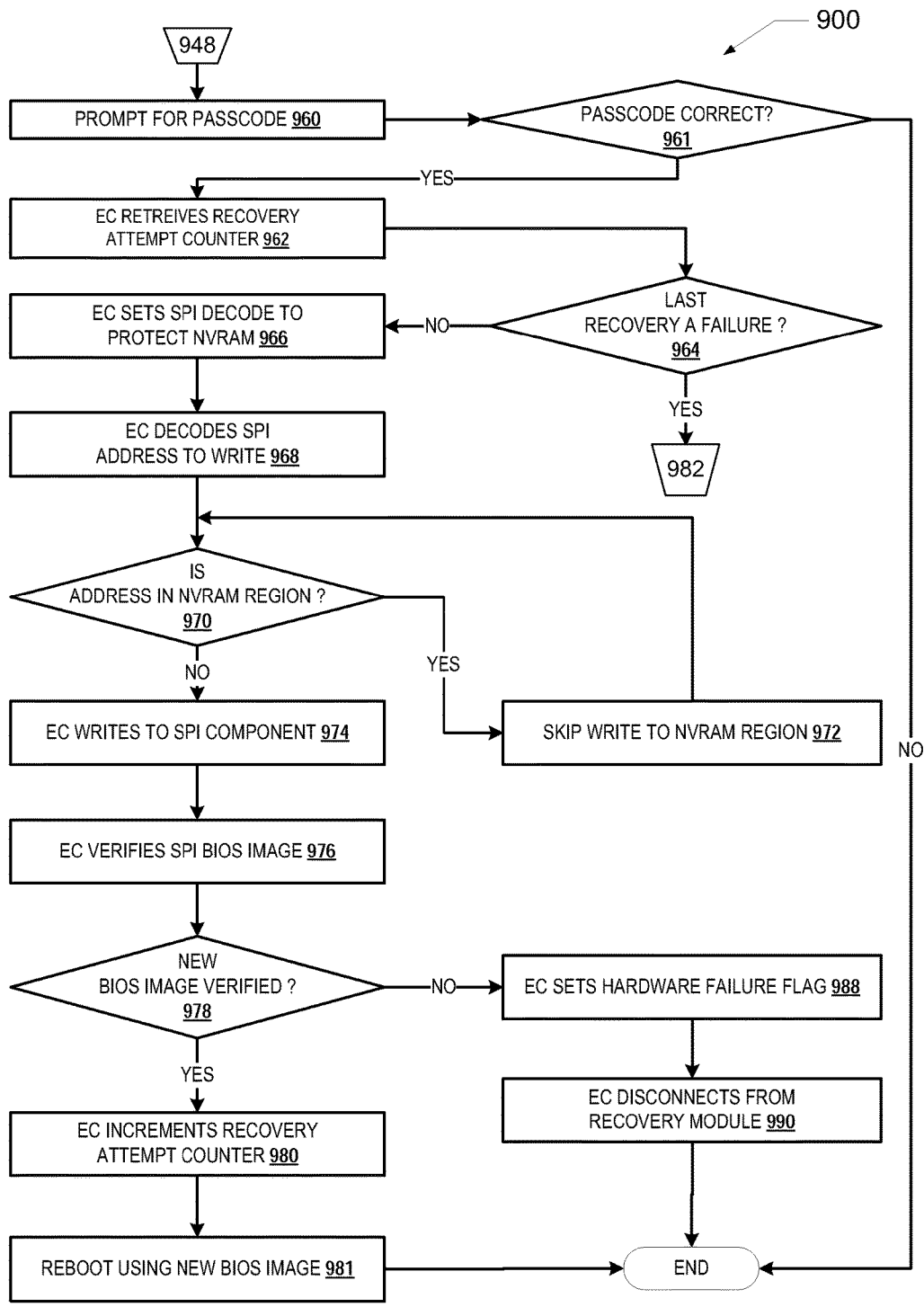

Turning now to FIGS. 9A-9C, which provides a flow chart illustrating an example method to recover IHS 100 from a non-operational state. With specific reference to FIG. 9A, method 900 begins at the start block and proceeds to block 902 where processor 105 initiates the BIOS post operation. At block 904, embedded controller 150 waits a pre-determined period of time for the BIOS post operation to complete and to receive a boot signal indicating the booting operation has successfully completed and IHS 100 is in an operational state. If the boot signal is not received, IHS 100 is assumed to be non functional and/or in a non-operational state. Embedded controller 150 determines if the boot signal has been received from processor 105 (decision block 906).

In response to receiving the boot signal, embedded controller 150 clears recovery attempt counter 229 (block 910). Method 900 then ends.

In response to not receiving the boot signal, embedded controller 150 determines if a recovery option to recover IHS 100 from a non-operational state is enabled (decision block 912). In response to the recovery option not being enabled, method 900 terminates. In response to the recovery option being enabled, embedded controller 150 issues a query for the BIOS recovery module 250 (block 914) and determines if the BIOS recovery device 250 is communicatively coupled to and in communication with IHS 100 (decision block 916). In response to the BIOS recovery device 250 not being in communication with IHS 100, method 900 ends. In response to the BIOS recovery device 250 being in communication with IHS 100, embedded controller 150 performs a security authentication procedure with BIOS recovery module 250 via security authentication layer 222 (block 918). Embedded controller 150 determines if authentication of BIOS recovery device 250 is successful at decision block 920. In response to the authentication of BIOS recovery device 250 not being successful, embedded controller 150 prevents communication with BIOS recovery device 250 (block 922). Method 900 then ends.

With reference to FIG. 9B, in response to the authentication of BIOS recovery device 250 being successful, embedded controller 150 transmits IHS type 280 to BIOS recovery device 250 (block 930). The transmission of IHS type 280 to BIOS recovery device 250 causes the BIOS recovery device 250 to search for the BIOS payload associated with the IHS type and to return the identified BIOS payload to IHS 100. At decision block 932, embedded controller 150 determines if the BIOS recovery device contains at least one BIOS payload 762-768 that corresponds to the IHS type 280. In response to determining that the BIOS recovery device 250 does not contain a BIOS payload 762-768 corresponding to the IHS type 280, embedded controller 150 disconnects from the BIOS recovery device 250 (block 934). Method 900 then terminates.

In response to determining that the BIOS recovery device 250 contains the BIOS payload (from among BIOS payloads 762-768) corresponding to the IHS type 280, embedded controller 150 performs a signature check on the corresponding BIOS payload (762-768) via micro-controller 710 (decision block 938). In response to the signature check not being confirmed, embedded controller 150 disconnects from the BIOS recovery device 250 (block 940) and method 900 ends. In response to the signature check being confirmed, embedded controller 150 triggers the BIOS recovery device 250 to transmit the corresponding BIOS payload (762-768) from the BIOS recovery device 250 to the embedded controller 150 (block 942).

At this point, the BIOS recovery device 250 is ready to transmit (stream) BIOS payloads to embedded controller 150. At block 948, embedded controller 150 determines whether IHS 100 supports a serial peripheral interface to at least one processor support component 210. In response to IHS 100 supporting the serial peripheral interface to the processor support components 210, embedded controller 150 resets the processor support components 210 (block 950). Embedded controller 150 emulates the serial peripheral interface 225, 227 and transmits the corresponding BIOS payload (762-768) to the processor support component 210 (block 952). At block 954, embedded controller 150 triggers processor 105 to reboot using the new BIOS payload. Processor 105 initiates a booting operation of IHS 100 using the new BIOS payload (762-768) (block 956). Method 900 then ends.

Referring to FIG. 9C, in In response to IHS 100 not supporting the serial peripheral interface to the processor support component 210 at block 948, embedded controller 150 prompts for entry of a passcode (block 960) and determines if the passcode is correct (block 961). In response to the passcode being incorrect, method 900 terminates. In response to the passcode being correct, embedded controller 150 retrieves recovery attempt counter 229 (block 962) and determines if a previous recovery attempt was unsuccessful (block 964). In response to the previous recovery attempt not being successful, embedded controller 150 prevents a write operation (sets protected region 213) of non-volatile memory device 212 (block 966) and decodes a write address associated with the new BIOS payload (block 968). Embedded controller 150 determines if the write address is within the protected region 213 of non-volatile memory device 212 (decision block 970).

In response to the write address being within the protected region 213 of non-volatile memory device 212, embedded controller 150 does not write to non-volatile memory device 212 (block 972) and returns to block 970. In response to the write address not being within the protected region of non-volatile memory device 212, embedded controller 150 transmits the new BIOS payload to memory interface device 214 (block 974) and verifies the new BIOS payload has been stored (block 976). At decision block 978, embedded controller 150 determines if the new BIOS payload is verified as being stored. In response to the BIOS payload being stored to memory device 212, embedded controller 150 increments recovery attempt counter 229 (block 980) and triggers IHS 100 to reboot using the new BIOS payload (block 981). Method 900 then ends. In response to the BIOS payload not being verified as stored to memory device 212, embedded controller 150 sets a hardware failure flag (block 988) and disconnects from the BIOS recovery device 250 (block 990). Method 900 then ends.

Figure 9D:
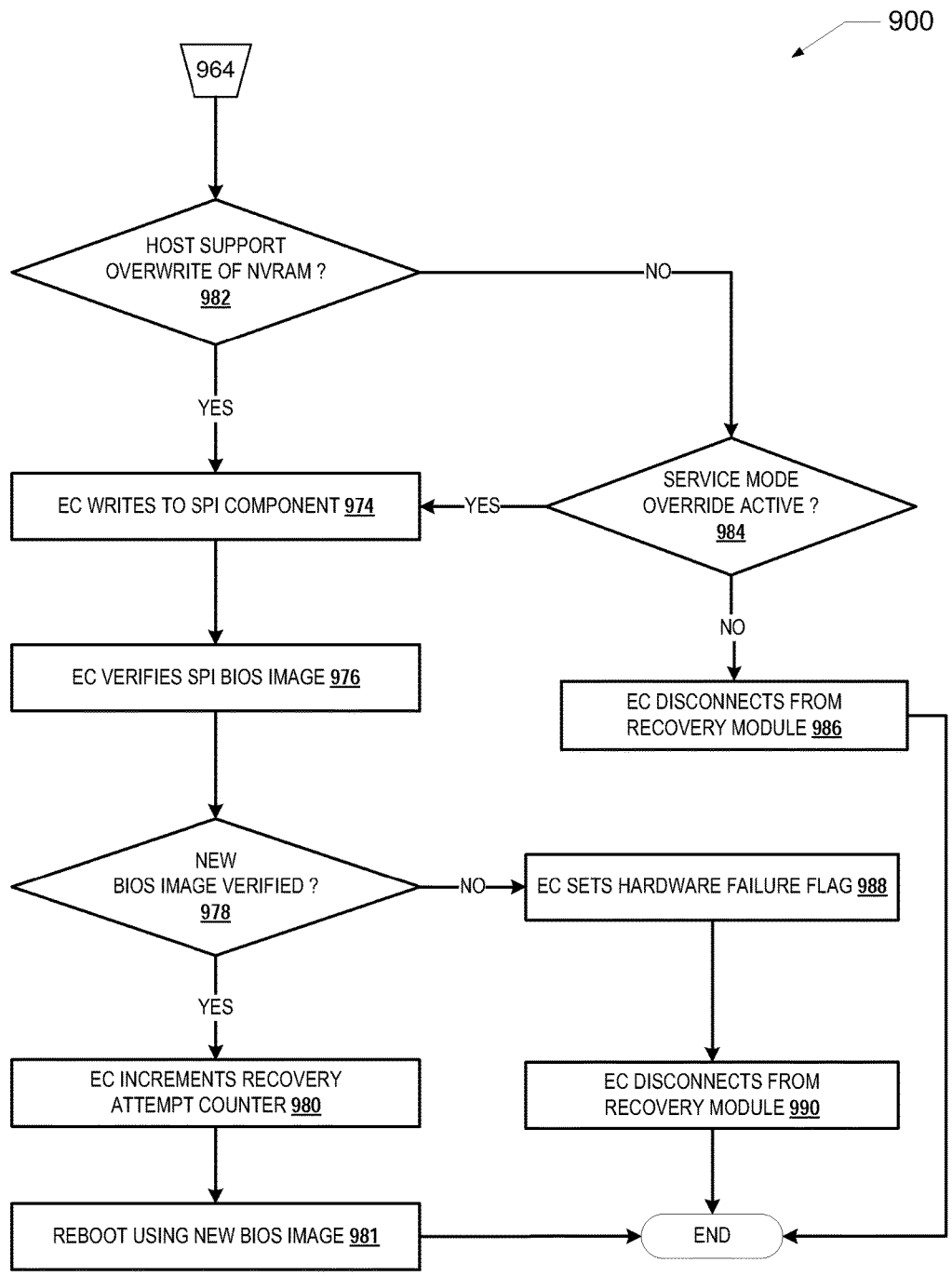

Turning now to FIG. 9D, in response to the previous recovery attempt being successful at decision block 964, embedded controller 150 determines if IHS 100 supports overwriting non-volatile memory device 212, (decision block 982). In response to IHS 100 supporting overwriting of non-volatile memory device 212, embedded controller 150 transmits the new BIOS payload to memory interface device 214 for storage to memory device 212 (block 974).

In response to IHS 100 not supporting overwriting of non-volatile memory device 212, embedded controller 150 determines if a service mode override state is operational (decision block 984). In response to the service mode override state being operational, embedded controller 150 transmits the new BIOS payload to memory interface device 214 for storage to memory device 212 (block 974). In response to the service mode override state not being operational, embedded controller 150 disconnects from the BIOS recovery device 250 (block 986). Method 900 then ends.

After the new BIOS payload has been stored at block 974, embedded controller 150 verifies the new BIOS payload has been stored (block 976). At decision block 978, embedded controller 150 determines if the new BIOS payload is verified as being stored. In response to the BIOS payload being stored to memory device 212, embedded controller 150 increments recovery attempt counter 229 (block 980) and triggers IHS 100 to reboot using the new BIOS payload (block 981). Method 900 then ends. In response to the BIOS payload not being verified as stored to memory device 212, embedded controller 150 sets a hardware failure flag (block 988) and disconnects from the BIOS recovery device 250 (block 990). Method 900 then ends.

In the above described flow chart, one or more of the methods may be embodied in a computer readable medium containing computer readable code such that a series of functional processes are performed when the computer readable code is executed on a computing device. In some implementations, certain steps of the methods are combined, performed simultaneously or in a different order, or perhaps omitted, without deviating from the scope of the disclosure. Thus, while the method blocks are described and illustrated in a particular sequence, use of a specific sequence of functional processes represented by the blocks is not meant to imply any limitations on the disclosure. Changes may be made with regards to the sequence of processes without departing from the scope of the present disclosure. Use of a particular sequence is therefore, not to be taken in a limiting sense, and the scope of the present disclosure is defined only by the appended claims.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. Computer program code for carrying out operations for aspects of the present disclosure may be written in any combination of one or more programming languages, including an object oriented programming language, without limitation. These computer program instructions may be provided to a processor of a general purpose computer, special purpose computer, such as a service processor, or other programmable data processing apparatus to produce a machine, such that the instructions, which execute via the processor of the computer or other programmable data processing apparatus, performs the method for implementing the functions/acts specified in the flowchart and/or block diagram block or blocks.

One or more of the embodiments of the disclosure described can be implementable, at least in part, using a software-controlled programmable processing device, such as a microprocessor, digital signal processor or other processing device, data processing apparatus or system. Thus, it is appreciated that a computer program for configuring a programmable device, apparatus or system to implement the foregoing described methods is envisaged as an aspect of the present disclosure. The computer program may be embodied as source code or undergo compilation for implementation on a processing device, apparatus, or system. Suitably, the computer program is stored on a carrier device in machine or device readable form, for example in solid-state memory, magnetic memory such as disk or tape, optically or magneto-optically readable memory such as compact disk or digital versatile disk, flash memory, etc. The processing device, apparatus or system utilizes the program or a part thereof to configure the processing device, apparatus, or system for operation.

As will be further appreciated, the processes in embodiments of the present disclosure may be implemented using any combination of software, firmware or hardware. Accordingly, aspects of the present disclosure may take the form of an entirely hardware embodiment or an embodiment combining software (including firmware, resident software, micro-code, etc.) and hardware aspects that may all generally be referred to herein as a "circuit," "module," or "system." Furthermore, aspects of the present disclosure may take the form of a computer program product embodied in one or more computer readable storage device(s) having computer readable program code embodied thereon. Any combination of one or more computer readable storage device(s) may be utilized. The computer readable storage device may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage device would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible medium that can contain, or store a program for use by or in connection with an instruction execution system, apparatus, or device.

While the disclosure has been described with reference to exemplary embodiments, it will be understood by those skilled in the art that various changes may be made and equivalents may be substituted for elements thereof without departing from the scope of the disclosure. In addition, many modifications may be made to adapt a particular system, device or component thereof to the teachings of the disclosure without departing from the essential scope thereof. Therefore, it is intended that the disclosure not be limited to the particular embodiments disclosed for carrying out this disclosure, but that the disclosure will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope of the disclosure. The described embodiments were chosen and described in order to best explain the principles of the disclosure and the practical application, and to enable others of ordinary skill in the art to understand the disclosure for various embodiments with various modifications as are suited to the particular use contemplated.

What is claimed is:

1. A computer implemented method for recovering an information handling system (IHS) from a non-operational state, the method comprising:

determining, via an embedded controller of the IHS, if the non-operational state of the IHS has occurred, wherein the non-operational state of the IHS occurs when an update to BIOS malfunctions;

in response to determining that the non-operational state of the IHS has occurred, identifying if a BIOS recovery device is communicatively coupled to the embedded controller;

in response to identifying that the BIOS recovery device is communicatively coupled to the embedded controller, authenticating whether the BIOS recovery device is authorized to communicate with the IHS;

in response to the BIOS recovery device being authorized to communicate with the IHS, triggering the BIOS recovery device to transmit a first BIOS payload from the BIOS recovery device to the embedded controller by:

transmitting a first IHS type to the BIOS recovery device;

determining if the BIOS recovery device contains a first BIOS payload corresponding to the first IHS type; and in response to the BIOS recovery device containing the first BIOS payload, triggering the BIOS recovery device to transmit the first BIOS payload from the BIOS recovery device to the embedded controller; and triggering the IHS to restart using the first BIOS payload.

2. The method of claim 1, further comprising:
signaling the BIOS recovery device to determine if the BIOS recovery device contains a first BIOS payload corresponding to the first IHS type.

3. The method of claim 1, wherein in response to determining that the BIOS recovery device does not contain the first BIOS payload corresponding to the first IHS type, disconnecting the BIOS recovery device.

4. The method of claim 1, further comprising:
in response to the BIOS recovery device not being authorized to communicate with the IHS, preventing the embedded controller from communicating with the BIOS recovery device.

5. The method of claim 1, further comprising:
identifying whether the IHS supports a serial peripheral interface to at least one processor support component; and in response to the IHS supporting the serial peripheral interface to the least one processor support component:
resetting the processor support components;
emulating, via the embedded controller, the serial peripheral interface; and
triggering the BIOS recovery device to transmit the first BIOS payload from the BIOS recovery device to the at least one processor support component.

6. The method of claim 1, wherein:
the BIOS recovery device is communicatively coupled to the embedded controller via at least one of a universal serial bus connector, a battery connector, an audio connector and a power connector.

7. The method of claim 5, further comprising:
in response to the IHS not supporting the serial peripheral interface to the at least one processor support component, determining if a previous recovery attempt was successful;

in response to the previous recovery attempt not being successful, preventing a write operation to a protected region of the memory device;

decoding a write address associated with the first BIOS payload;

determining if the write address is within the protected region of the memory device; and in response to the write address not being within the protected region of the memory device, transmitting the first BIOS payload to a memory interface device.

8. The method of claim 7, further comprising:

determining if the first BIOS payload has been stored to the memory device;

in response to the first BIOS payload being stored to the memory device, incrementing a recovery attempt counter; and triggering the IHS to restart using the first BIOS payload.

9. The method of claim 7 further comprising:

determining if the first BIOS payload has been stored to the memory device;

in response to the first BIOS payload not being stored to the memory device, setting a hardware failure flag; and disconnecting the BIOS recovery device.

10. An information handling system (IHS) comprising:

a processor;

a memory coupled to the processor via a system interconnect;

an embedded controller communicatively coupled to the system interconnect, the embedded controller having firmware executing thereon to enable the IHS to recover from a non-operational state of the IHS, wherein the firmware configures the embedded controller to:

determine when the non-operational state of the IHS has occurred, wherein the non-operational state of the IHS occurs when an update to BIOS malfunctions;

in response to determining that the non-operational state of the IHS has occurred, identify if a BIOS recovery device is communicatively coupled to the embedded controller;

in response to identifying that the BIOS recovery device is communicatively coupled to the embedded controller, authenticate whether the BIOS recovery device is authorized to communicate with the IHS;

in response to the BIOS recovery device being authorized to communicate with the IHS, trigger the BIOS recovery device to transmit the first BIOS payload from the BIOS recovery device to the embedded controller, wherein the embedded controller:

transmits a first IHS type to the BIOS recovery device;

determines if the BIOS recovery device contains a first BIOS payload corresponding to the first IHS type; and in response to the BIOS recovery device containing the first BIOS payload:

trigger the BIOS recovery device to transmit the first BIOS payload from the BIOS recovery device to the embedded controller; and trigger the IHS to restart using the first BIOS payload.

11. The information handling system of claim 10, wherein the firmware further configures the embedded controller to:

signal the BIOS recovery device to determine if the BIOS recovery device contains a first BIOS payload corresponding to the first IHS type.

12. The information handling system of claim 10, wherein in response to determining that the BIOS recovery device does not contain the first BIOS payload corresponding to the first IHS type, the firmware further configures the embedded controller to disconnect the BIOS recovery device.

13. The information handling system of claim 10, wherein the firmware further configures the embedded controller to:

in response to the BIOS recovery device not being authorized to communicate with the IHS, prevent the embedded controller from communicating with the BIOS recovery device.

14. The information handling system of claim 10, wherein the firmware further configures the embedded controller to:

identify whether the IHS supports a serial peripheral interface to at least one processor support component; and in response to the IHS supporting the serial peripheral interface to the least one processor support component:

reset the processor support components;

emulate, via the embedded controller, the serial peripheral interface; and trigger the BIOS recovery device to transmit the first BIOS payload from the BIOS recovery device to the at least one processor support component.

15. The information handling system of claim 10, wherein:

the BIOS recovery device is communicatively coupled to the embedded controller by at least one connector of a universal serial bus connector, a battery connector, an audio connector and a power connector.

16. The information handling system of claim 14, wherein the firmware further configures the embedded controller to:

in response to the IHS not supporting the serial peripheral interface to the at least one processor support component, determine if a previous recovery attempt was successful;

in response to the previous recovery attempt not being successful, prevent a write operation to a protected region of the memory device;

decode a write address associated with the first BIOS payload;

determine if the write address is within the protected region of the memory device; and in response to the write address not being within the protected region of the memory device, transmit the first BIOS payload to a memory interface device.

17. The information handling system of claim 16, wherein the firmware further configures the embedded controller to:

determine if the first BIOS payload has been stored to the memory device;

in response to the first BIOS payload being stored to the memory device, increment a recovery attempt counter; and trigger the IHS to restart using the first BIOS payload.

18. The information handling system of claim 16, wherein the firmware further configures the embedded controller to:

determine if the first BIOS payload has been stored to the memory device;

in response to the first BIOS payload not being stored to the memory device, set a hardware failure flag; and disconnect the BIOS recovery device.

19. A basic input-output system (BIOS) recovery device for recovering an information handling system (IHS) from a non-operational state of the IHS, the BIOS recovery device configured to be selectively connected to the IHS, the BIOS recovery device comprising:

a micro-controller;

a storage device communicatively coupled to the micro-controller;

at least one BIOS payload stored on the storage device;

the micro-controller having firmware executing thereon to enable the IHS to recover from the non-operational state of the IHS, wherein the non-operational state of the IHS occurs when an update to BIOS malfunctions, and wherein the firmware configures the micro-controller to:

receive a request from an embedded controller of the IHS to determine if the storage device contains a first BIOS payload corresponding to a first IHS type associated with the connected IHS;

in response to receiving the request and determining that the storage device contains the first BIOS payload corresponding to the first IHS type, authenticate whether the BIOS recovery device is authorized to communicate with the IHS;

in response to the BIOS recovery device being authorized to communicate with the IHS, receive a trigger from the embedded controller to the BIOS recovery device to transmit the first BIOS payload from the BIOS recovery device to the embedded controller; and in response to receiving the trigger, transmit the first BIOS payload from the BIOS recovery device to the embedded controller.

20. The BIOS recovery device of claim 19, wherein IHS includes at least one external device connector that allows the IHS to be coupled to the BIOS recovery device.

21. The BIOS recovery device of claim 19, wherein:

the at least one connector is one or more of a universal serial bus connector, a battery connector, an audio connector and a power connector.

22. The BIOS recovery device of claim 19, wherein the firmware further configures the micro-controller to:

receive a payload store request;

receive the first BIOS payload;

verify a payload signature; and in response to verifying the payload signature, store the first BIOS to the storage device.

* * * * *